(12) United States Patent
Kang et al.

(10) Patent No.: US 11,568,519 B2
(45) Date of Patent: Jan. 31, 2023

(54) IMAGE ENHANCEMENT METHOD, IMAGE ENHANCEMENT APPARATUS, AND METHOD AND APPARATUS FOR TRAINING IMAGE ENHANCEMENT APPARATUS

(71) Applicant: Samsung Electronics Co., Ltd., Suwon-si (KR)

(72) Inventors: Eunhee Kang, Suwon-si (KR); Kinam Kwon, Suwon-si (KR); Sujin Lee, Yongin-si (KR); Hyong Euk Lee, Suwon-si (KR); Byung In Yoo, Seoul (KR); Sangwon Lee, Seongnam-si (KR); Jae Seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 17/196,084

(22) Filed: Mar. 9, 2021

(65) Prior Publication Data
US 2022/0067889 A1    Mar. 3, 2022

(30) Foreign Application Priority Data
Aug. 31, 2020    (KR) .......................... 10-2020-0110659

(51) Int. Cl.
*G06T 5/00*    (2006.01)
(52) U.S. Cl.
CPC .............. *G06T 5/003* (2013.01); *G06T 5/002* (2013.01); *G06T 2207/10024* (2013.01); *G06T 2207/20081* (2013.01)
(58) Field of Classification Search
CPC .................... G06T 5/003; G06T 5/002; G06T 2207/10024; G06T 2207/20081; G06T 2207/20084; G06T 5/50; G06T 5/001; G06T 2207/20192; G06T 2207/20076; G06T 5/008; G06T 3/4046; G06T 9/002; G06N 20/00; G06N 3/02; G06N 3/08–088; G06N 3/0445; G06N 3/0454; G06N 7/00; G06K 9/623; G06K 9/6257; G06K 9/627; G06K 9/6298; G06K 9/6256; G06K 9/6215; G06K 9/626; G06K 9/6277;
(Continued)

(56) References Cited

U.S. PATENT DOCUMENTS 7,742,652 B2    6/2010    Oh et al.
8,280,180 B2    10/2012   Banner et al.
(Continued)

FOREIGN PATENT DOCUMENTS

KR    10-1796523 B1    11/2017
KR    10-1844332 B1    4/2018
(Continued)

*Primary Examiner* — Jose L Couso
(74) *Attorney, Agent, or Firm* — NSIP Law

(57) ABSTRACT

An image enhancement method, an image enhancement apparatus, and a method and apparatus for training the image enhancement apparatus are provided. The image enhancement apparatus may enhance a quality of a raw image captured by an under-display camera (UDC). The image enhancement apparatus may process the raw image for each channel according to characteristics of a photographing environment of the UDC. The image enhancement apparatus may further enhance the image by processing the raw image to reflect characteristics for each channel.

14 Claims, 17 Drawing Sheets

(58) Field of Classification Search
CPC .... G06K 9/6263; G06K 7/1482; G06V 10/30; G06V 10/454; G06V 10/72; G06V 10/764; G06V 10/7747; G06V 10/82; G06V 30/18057; H04N 19/85; H04N 19/646; H04N 5/21; H04N 5/217; H04N 5/243

See application file for complete search history.

(56) References Cited

U.S. PATENT DOCUMENTS

| | | | |
|---|---|---|---|
| 8,503,811 B2 | 8/2013 | Yahil | |
| 8,687,913 B2 | 4/2014 | Lin | |
| 10,593,021 B1* | 3/2020 | Shen | G06T 5/003 |
| 10,643,313 B2 | 5/2020 | DeWeert et al. | |
| 10,755,173 B2* | 8/2020 | Wang | G06T 5/50 |
| 11,037,278 B2* | 6/2021 | Zamir | G06N 20/00 |
| 11,107,205 B2* | 8/2021 | Hu | G06T 5/007 |
| 11,272,106 B1 | 3/2022 | Lee et al. | |
| 2017/0372193 A1* | 12/2017 | Mailhe | G06N 3/084 |
| 2019/0171908 A1* | 6/2019 | Salavon | G06V 10/82 |
| 2019/0303720 A1* | 10/2019 | Karam | G06K 9/624 |
| 2020/0092475 A1 | 3/2020 | Meler et al. | |
| 2020/0143522 A1 | 5/2020 | Vogels et al. | |
| 2020/0234402 A1* | 7/2020 | Schwartz | G06T 5/002 |
| 2020/0242515 A1* | 7/2020 | Reddy | G06T 5/003 |
| 2020/0285883 A1* | 9/2020 | Hiasa | G06K 9/6257 |
| 2020/0285901 A1* | 9/2020 | Hiasa | H04N 5/361 |
| 2020/0311981 A1* | 10/2020 | Hiasa | H04N 5/355 |
| 2021/0035338 A1* | 2/2021 | Zhou | G06N 20/20 |
| 2021/0073959 A1* | 3/2021 | Elmalem | G06V 10/764 |
| 2021/0074036 A1* | 3/2021 | Fuchs | G06N 3/0454 |
| 2021/0152735 A1* | 5/2021 | Zhou | G06V 10/774 |
| 2022/0130084 A1* | 4/2022 | Litwiller | G06T 5/50 |

FOREIGN PATENT DOCUMENTS

| | | |
|---|---|---|
| KR | 10-1868266 B1 | 6/2018 |
| KR | 10-1990540 B1 | 6/2019 |
| KR | 10-2056073 B1 | 12/2019 |

* cited by examiner

IMAGE ENHANCEMENT METHOD, IMAGE ENHANCEMENT APPARATUS, AND METHOD AND APPARATUS FOR TRAINING IMAGE ENHANCEMENT APPARATUS

CROSS-REFERENCE TO RELATED APPLICATIONS

This application claims the benefit under 35 USC § 119(a) of Korean Patent Application No. 10-2020-0110659, filed on Aug. 31, 2020, in the Korean Intellectual Property Office, the entire disclosure of which is incorporated herein by reference for all purposes.

BACKGROUND

Field

The following description relates to an image enhancement technology and a method of training an image enhancement apparatus.

Description of Related Art

Cameras for capturing images are mounted in various electronic devices and are widely used. In mobile devices such as smartphones, cameras have become an essential component, and the over time, the performance of cameras is increasing and the size of cameras is decreasing. Generally, a smartphone includes a front-facing camera and a rear-facing camera, and the front-facing camera is disposed in an upper area of the smartphone and is sometime used to take a selfie.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of training an image enhancement apparatus, the method including generating a training raw image using an under-display camera (UDC), acquiring a first intermediate vector by performing denoising on the training raw image using a denoising network, acquiring a first result vector for at least one channel by performing deblurring on the first intermediate vector using a deblurring network, calculating a first loss value between the first result vector and a training ground truth (GT) image corresponding to the training raw image using at least one first differentiator, and training the deblurring network and the at least one first differentiator based on the first loss value, acquiring a third intermediate vector by performing denoising on the training GT image using the denoising network, acquiring a second result vector for the at least one channel by performing blurring on the third intermediate vector using a blurring network, and calculating a second loss value between the second result vector for the at least one channel and the training raw image using at least one second differentiator, and training the blurring network and the at least one second differentiator based on the second loss value.

The at least one first differentiator may include a first differentiator for R/G channels configured to receive a first result vector of an R channel and a first result vector of a G channel, and a first differentiator for a B channel configured to receive a first result vector of a B channel, and the at least one second differentiator may include a second differentiator for the R/G channels configured to receive a second result vector of the R channel and a second result vector of the G channel, and a second differentiator for the B channel configured to receive a second result vector of the B channel.

The at least one first differentiator may include a first differentiator for an R channel configured to receive a first result vector of an R channel, a first differentiator for a G channel configured to receive a first result vector of a G channel, and a first differentiator for a B channel configured to receive a first result vector of a B channel, and the at least one second differentiator may include a second differentiator for the R channel configured to receive a second result vector of the R channel, a second differentiator for the G channel configured to receive a second result vector of the G channel, and a second differentiator for the B channel configured to receive a second result vector of the B channel.

The at least one first differentiator may include a first differentiator for R/G/B channels configured to receive a first result vector of an R channel, a first result vector of a G channel and a first result vector of a B channel, and the at least one second differentiator may include a second differentiator for the R/G/B channels configured to receive a second result vector of the R channel, a second result vector of the G channel and a second result vector of the B channel.

The method may include reflecting noise to a training input image, acquiring a third result vector by inputting a result image reflecting the noise to the denoising network, calculating a third loss value between the third result vector and the training input image, and training the denoising network based on the third loss value.

The calculating of the first loss value may include calculating the first loss value based on a weighted average of at least one loss value between the first result vector for the at least one channel and the training GT image, and the calculating of the second loss value may include calculating the second loss value based on a weighted average of at least one loss value between the second result vector for the at least one channel and the training raw image.

The acquiring of the first result vector may include acquiring a second intermediate vector by performing deblurring on the first intermediate vector using the deblurring network, and acquiring the first result vector for the at least one channel by performing a noise compensation on the second intermediate vector based on a first residual signal between the training raw image and the first intermediate vector, and the acquiring of the second result vector may include acquiring a fourth intermediate vector by performing blurring on the third intermediate vector using the blurring network, and acquiring the second result vector for the at least one channel by performing a noise compensation on the fourth intermediate vector based on a second residual signal between the training GT image and the third intermediate vector.

The acquiring of the first result vector for the at least one channel by performing the noise compensation on the second intermediate vector may include adjusting a scale of the second intermediate vector, performing a multiplication between the adjusted second intermediate vector and the first residual signal, and acquiring the first result vector by summing a result vector of the multiplication and the second intermediate vector.

In another general aspect, there is provided an image enhancement method including generating an input raw image being generated by an under-display camera (UDC), acquiring a fifth intermediate vector by performing denoising on the input raw image using a denoising network, acquiring a sixth intermediate vector by performing deblurring on the fifth intermediate vector using a deblurring network, acquiring a fourth result vector for at least one channel by performing a noise compensation on the sixth intermediate vector based on a third residual signal between the input raw image and the fifth intermediate vector, and outputting an enhanced output image based on the fourth result vector for the at least one channel, wherein a first intermediate vector may be acquired by performing denoising on a training raw image generated by the UDC, using the denoising network, a first result vector for the at least one channel is acquired by performing deblurring on the first intermediate vector using the deblurring network, a first loss value between the first result vector for the at least one channel and a training ground truth (GT) image corresponding to the training raw image is calculated using at least one first differentiator, and the deblurring network and the at least one first differentiator are trained based on the first loss value, and wherein a third intermediate vector may be acquired by performing denoising on the training GT image using the denoising network, a second result vector for the at least one channel is acquired by performing blurring on the third intermediate vector using a blurring network, a second loss value between the second result vector for the at least one channel and the training raw image is calculated using at least one second differentiator, and the blurring network and the at least one second differentiator are trained based on the second loss value.

The first result vector for the at least one channel may be acquired by acquiring a second intermediate vector by performing deblurring on the first intermediate vector using the deblurring network, and by performing a noise compensation on the second intermediate vector based on a first residual signal between the training raw image and the first intermediate vector, and the second result vector may be acquired by acquiring a fourth intermediate vector by performing blurring on the third intermediate vector using the blurring network, and by performing a noise compensation on the fourth intermediate vector based on a second residual signal between the training GT image and the third intermediate vector.

The acquiring of the fourth result vector may include adjusting a scale of the sixth intermediate vector, performing a multiplication between the adjusted sixth intermediate vector and the third residual signal, and acquiring the fourth result vector by summing a result vector of the multiplication and the sixth intermediate vector and by combining a result of the summing and noise generated by a noise generator.

In another general aspect, there is provided an apparatus for training an image enhancement apparatus, the apparatus including an under-display camera (UDC) configured to generate a training raw image using, and a processor configured to acquire a first intermediate vector by performing denoising on the training raw image using a denoising network, acquire a first result vector for at least one channel by performing deblurring on the first intermediate vector using a deblurring network, calculate a first loss value between the first result vector and a training ground truth (GT) image corresponding to the training raw image using at least one first differentiator, and train the deblurring network and the at least one first differentiator based on the first loss value, acquire a third intermediate vector by performing denoising on the training GT image using the denoising network, acquire a second result vector for the at least one channel by performing blurring on the third intermediate vector using a blurring network, and calculate a second loss value between the second result vector for the at least one channel and the training raw image using at least one second differentiator, and train the blurring network and the at least one second differentiator based on the second loss value.

The processor may be configured to acquire a second intermediate vector by deblurring the first intermediate vector using the deblurring network, acquire the first result vector for the at least one channel by performing a noise compensation on the second intermediate vector based on a first residual signal between the training raw image and the first intermediate vector, acquire a fourth intermediate vector by blurring the third intermediate vector using the blurring network, and acquire the second result vector for the at least one channel by performing a noise compensation on the fourth intermediate vector based on a second residual signal between the training GT image and the third intermediate vector.

Other features and aspects will be apparent from the following detailed description, the drawings, and the claims.

Figure 1:
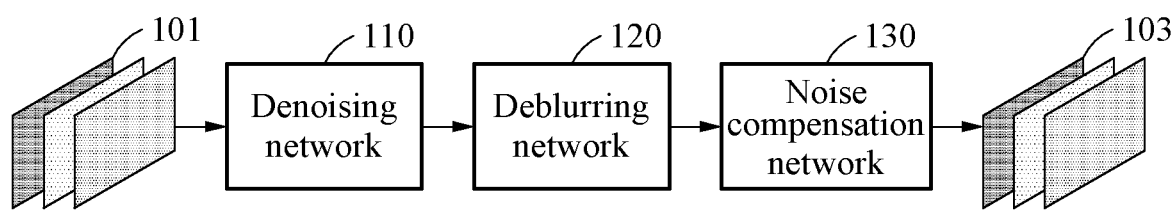
FIG. 1 illustrates an example of a process in which an image is enhanced by an image enhancement method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to examples. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example is described using a like name in another example. Unless otherwise described, description made in one example may be applicable to another example and detailed description within a duplicate range is omitted.

FIG. 1 illustrates an example of a process in which an image is enhanced by an image enhancement method.

An under-display camera (UDC) is an image acquisition device in which an image sensor is disposed under a display of an electronic device. In the UDC, an image sensor that receives external light may be disposed inside the electronic device, instead of being exposed to the outside. Since the image sensor is disposed inside the electronic device, a region in which the image sensor is disposed may be implemented as a display region. Thus, for a maximum size of the display region, it is possible to completely implement a rectangular display without a need to implement a shape of the display to be a shape of a notch or to dispose an independent image sensor region inside the display region.

The UDC may acquire image data based on external light passing through hole regions of a display layer. An image may be output through pixel regions, similar to pixel regions included in another region of the display. The display layer may be a component forming a display panel, and may correspond to a layer in which pixel regions are arranged. The display layer may include various pixel regions and circular hole regions. An arrangement pattern of pixel regions and hole regions may be repeatedly represented in the display layer corresponding to one region. Regions other than the hole regions in the display layer may be blocked, and accordingly external light may pass through the hole regions to reach the image sensor.

The UDC may be embedded and operate in an electronic device, for example, a smartphone, a table computer, a wearable device, a netbook, a laptop, a personal digital assistant (PDA), or a smart home device. An image acquisition device may be embedded and operate in an electronic device including a display, without a limitation.

The image sensor may be disposed under the display layer, and may be configured to sense external light passing through the hole regions and to generate a raw image. The raw image may be an image generated by the image sensor sensing hole regions of the UDC, and may include, for example, a demosaiced RGB image.

Since a portion of light passing through the hole regions among light incident on the display layer reaches the image sensor, the raw image acquired by the image sensor may have an image quality lower than that a desired image quality. For example, the raw image may have a relatively low luminance and a large amount of noise due to occlusion of the pixel regions. Also, the hole regions may function as slits, and accordingly the raw image may have artifacts caused by an influence by a diffraction. For example, in the raw image, a blur or flare phenomenon may occur.

Denoising and deblurring may tend to conflict with each other. For example, when denoising and deblurring are learned through a single network, a problem such as a decrease in a capability of resolving a blur when a noise level increases may occur. To implement denoising and deblurring with a relatively high performance using a single network, a size of the network may need to increase, which may indicate a reduction in a processing speed. In other words, the speed and the size of the network may be in a trade-off relationship.

The UDC may include a display panel in which holes are disposed on the image sensor. Since the holes function as multiple slits, diffraction may occur. Since the display panel absorbs light, an amount of light reaching the image sensor may decrease, which may lead to an increase in noise. Thus, the raw image may have a relatively large amount of noise, and a blur may occur due to an influence by the diffraction. Also, light may be absorbed by the display panel, and accordingly an intensity of the light may tend to decrease. For example, in a blue channel, an intensity shift may occur.

The raw image may have different characteristics for each channel. A degree to which light passing through holes is absorbed may be determined based on wavelength bands. A gap of a diffraction pattern may be adjusted based on a wavelength of light, and a point spread function (PSF) of each RGB channel may change. For example, a yellowish effect in which the entire image becomes yellowish may occur due to a relatively large amount of light with a blue wavelength band to be absorbed.

It is difficult to obtain training data in which a ground truth (GT) image and the raw image acquired by the UDC are pixel-wise matched. To obtain the training data, the same target may need to be captured by the UDC and a general camera in the same environment and the same position. Thus, it may be difficult to secure a plurality of pieces of training data.

Considering the above image quality degradation factors, image processing may be required to enhance the raw image according to characteristics of the raw image based on the UDC in a structure, such as the UDC. In an example, an image enhancement apparatus may restore the raw image acquired by the image sensor to show a similar image quality to that of a general image captured by a camera in a general environment. The image enhancement apparatus may effectively restore an image based on an arrangement of hole regions, and may provide a clear image with a high quality even in an environment of the UDC.

In an example, the image enhancement apparatus may enhance the raw image captured by the UDC. The image enhancement apparatus may process the raw image for each channel according to characteristics of a photographing environment of the UDC. The image enhancement apparatus may process the raw image by reflecting characteristics for each channel, to acquire a further enhanced image.

In an example, a denoising network and a deblurring network of the image enhancement apparatus may be separately trained. The denoising network and the deblurring network may be trained through respective separate training processes. The denoising network and the deblurring network may be trained at the same time or at different times. Trained parameters of the denoising network may be shared in training of the deblurring network. When training is performed at different times, the denoising network may be trained, and then the deblurring network may be trained using the trained denoising network. When training is performed at the same time, the denoising network and the deblurring network may have respective separate pipelines for training. A pipeline of the denoising network may perform a separate training process. A pipeline of the deblurring network may be a cyclic generative adversarial network (GAN) including the denoising network, and the denoising network with the pipeline of the deblurring network may share the parameters trained in the denoising network. Thus, the denoising network and the deblurring network of the image enhancement apparatus may be trained at a relatively high level.

In an example, the image enhancement apparatus may be trained using a cyclic GAN. By a scheme of comparing the GT image to a result image obtained by processing the raw image, and of comparing the raw image to a result image obtained by processing the GT image, a neural network included in the image enhancement apparatus may be cyclically trained. Since a backward path from the GT image to the raw image is present in the cyclic GAN, the image enhancement apparatus may achieve a relatively large amount of training effects even based on a small quantity of training data. The GT image may be referred to as a "correct answer image" of a training process.

To this end, the image enhancement apparatus may include a denoising network 110, a deblurring network 120, and a noise compensation network 130. Since noise is also included in the GT image, the noise compensation network 130 may be included in the image enhancement apparatus to enhance a raw image 101 similarly to the GT image.

In an example, in a training process, the denoising network 110 and the deblurring network 120 may be separately trained based on different pieces of training data. The denoising network 110 may be pre-trained based on a training image in which a blur is absent, through a separate training process.

In an example, a training process without a noise compensation may be performed. Since a noise level of the GT image varies depending on an illuminance and a gain, it may be difficult for a differentiator to differentiate a result obtained after a noise compensation from the GT image. An influence by noise among three factors, for example, a blur, noise, and an intensity shift, that need to be used to determine whether an image is real or fake by the differentiator may be omitted, and thus the training process may further concentrate on the other two factors.

In another example, a result obtained by cancelling noise from the raw image through the denoising network 110 may be input to the deblurring network 120, and a noise compensation may be performed on a result obtained by removing a blur. The deblurring network 120 may be trained by comparing the GT image to a result obtained by performing the noise compensation.

An order that the denoising network 110 and the deblurring network 120 are trained is not limited to the above description. In an example, the deblurring network 120 may be trained and the denoising network 110 may be trained through the trained deblurring network 120. In another example, the denoising network 110 and the deblurring network 120 may be simultaneously trained based on different pieces of training data.

An output of a network and the GT image may be compared by the differentiator. A loss value of a difference between the GT image and a result obtained by performing the noise compensation may be calculated. Based on the loss value, the deblurring network 120 and the noise compensation network 130 may be trained by a backpropagation scheme. The denoising network 110, the deblurring network 120 and the noise compensation network 130 may function as generators. The generators may be trained to deceive the differentiator, and the differentiator may be trained to distinguish between the GT image (real) and outputs 103 (fake) of the generators.

The noise level of the GT image may vary depending on the illuminance and the gain. To deceive the differentiator more effectively, the noise compensation network 130 may perform scaling on input noise according to the level of noise in the GT image.

The differentiator may include different types of differentiators. In an example, the differentiator may include, for example, a differentiator for R/G channels configured to compare the GT image to result vectors of an R channel and a G channel, and a differentiator for a B channel configured to compare the GT image to a result vector of the B channel. In another example, the differentiator may include, for example, a plurality of differentiators configured to compare the GT image to each of an R channel, a G channel and a B channel. In another example, the differentiator may include, for example, a single differentiator configured to compare the GT image to all an R channel, a G channel and a B channel.

$$\mathcal{L}_D = \alpha \mathcal{L}_{D(G/R)} + (1-\alpha) \mathcal{L}_{D(B)} \qquad \text{[Equation 1]}$$

In an example, when a differentiator for R/G channels and a differentiator for a B channel are used, a loss value may be calculated using Equation 1. In Equation 1, $L_D$ denotes a loss value of each differentiator. Based on Equation 1, a final loss value may be calculated by obtaining a weighted average of a loss value of the differentiator for R/G channels and a loss value of the differentiator for the B channel. A weight may be reflected to the loss values, and accordingly characteristics of each channel may be reflected to the loss values.

In another example, a blurring network may be trained through the backward path of the cyclic GAN. A result obtained by cancelling noise from the GT image through the denoising network 110 may be input to the blurring network, and a noise compensation may be performed on a result reflecting a blur. The blurring network may be trained by comparing the raw image and the result on which the noise compensation is performed.

The raw image and an output of a network of the backward path may be compared by the differentiator. A loss value of a difference between the raw image and the result on which the noise compensation is performed may be calculated. Based on the loss value, the blurring network and the noise compensation network 130 may be trained by a backpropagation scheme. The denoising network 110, the blurring network and the noise compensation network 130 may function as generators. The generators may be trained to deceive the differentiator, and the differentiator may be trained to distinguish between the GT image (real) and outputs 103 (fake) of the generators.

The differentiator may include different types of differentiators. In an example, the differentiator may include, for example, a differentiator for R/G channels configured to compare the GT image to result vectors of an R channel and a G channel, and a differentiator for a B channel configured to compare the GT image to a result vector of the B channel. In another example, the differentiator may include, for example, a plurality of differentiators configured to compare the GT image to each of an R channel, a G channel and a B channel. In another example, the differentiator may include, for example, a single differentiator configured to compare the GT image to all an R channel, a G channel and a B channel.

As described above, a cyclical training process may be performed multiple times based on one matching training data, and thus it is possible to achieve a data augmentation effect by performing a larger number of training processes even using a relatively small quantity of training data. As a result, an accuracy of the image enhancement apparatus may be enhanced.

The denoising network 110 and the deblurring network 120 may be separately trained based on different pieces of training data. The denoising network 110 may be pre-trained based on a training image in which a blur is absent through a separate training process. A result obtained by cancelling noise from the raw image through the denoising network 110 may be input to the deblurring network 120. The deblurring network 120 may be trained by comparing the GT image and a result obtained by removing a blur.

Figure 2:
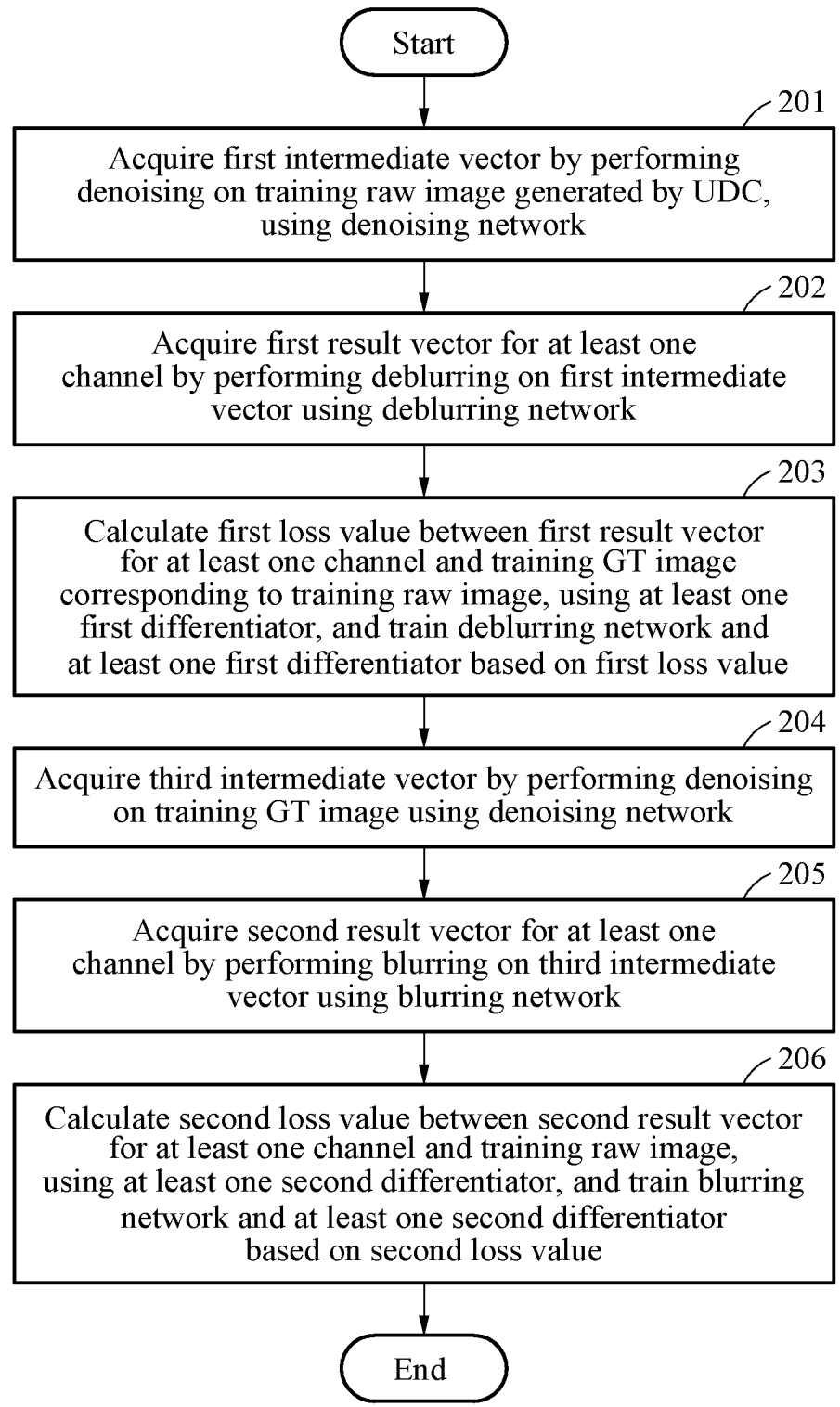
FIG. 2 illustrates an example of a method of training an image enhancement apparatus.

FIG. 2 illustrates an example of a method of training an image enhancement apparatus. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here. Referring to FIG. 2.

FIG. 2 illustrates an example of performing a noise compensation in a training process.

Referring to FIG. 2, in operation 201, a training apparatus acquires a first intermediate vector by performing denoising on a training raw image generated by a UDC, using a denoising network.

In operation 202, the training apparatus acquires a first result vector for at least one channel by performing deblurring on the first intermediate vector using a deblurring network.

In operation 203, the training apparatus calculates a first loss value between the first result vector and a training GT image corresponding to the training raw image, using at least one first differentiator, and trains the deblurring network and the at least one first differentiator based on the first loss value. The first loss value may be calculated by a weighted average of at least one loss value between the first result vector the at least one channel and the training GT image.

In operation 204, the training apparatus acquires a third intermediate vector by performing denoising on the training GT image using the denoising network.

In operation 205, the training apparatus acquires a second result vector for the at least one channel by performing blurring on the third intermediate vector using a blurring network.

In operation 206, the training apparatus calculates a second loss value between the second result vector for each of the at least one channel and the training raw image, using at least one second differentiator, and trains the blurring network and the at least one second differentiator based on the second loss value. The second loss value may be calculated by a weighted average of at least one loss value between the second result vector for the at least one channel and the training raw image.

A denoising network and a deblurring network of the image enhancement apparatus may be separately trained. The denoising network and the deblurring network may be trained at the same time or at different times. Trained parameters of the denoising network may be shared in training of the deblurring network.

To this end, the training apparatus may reflect noise to a training input image. The training apparatus may acquire a third result vector by inputting a result image reflecting the noise to the denoising network. The training apparatus may calculate a third loss value between the third result vector and the training input image, and may train the denoising network based on the third loss value.

Figure 3:
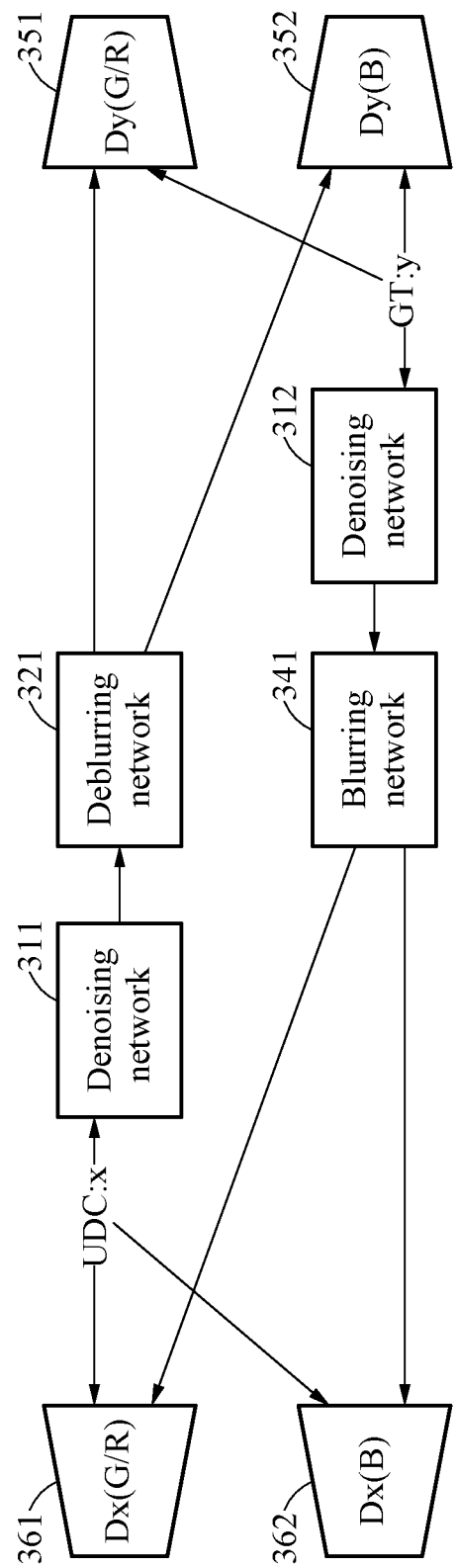
FIG. 3 illustrates an example of a method of training an image enhancement apparatus in which a differentiator for R/G channels and a differentiator for a B channel are separated, without a noise compensation process.

FIG. 3 illustrates an example of a method of training an image enhancement apparatus in which a differentiator for R/G channels and a differentiator for a B channel are separated, without a noise compensation process.

Referring to FIG. 3, at least one first differentiator may include a first differentiator 351 for R/G channels configured to receive a first result vector of an R channel and a first result vector of a G channel, and a first differentiator 352 for a B channel configured to receive a first result vector of a B channel. At least one second differentiator may include a second differentiator 361 for R/G channels configured to receive a second result vector of an R channel and a second result vector of a G channel, and a second differentiator 362 for a B channel configured to receive a second result vector of a B channel.

A denoising network 311 may receive a training raw image (UDC: x) and may output a first intermediate vector with reduced noise. A deblurring network 321 may receive the first intermediate vector and may output a first result vector with a reduced blur. The first result vector may include first result vectors for each of R/G/B channels.

The first differentiator 351 may compare the first result vector of the R channel and the first result vector of the G channel to a training GT image (GT: y), and may acquire a loss value. The first differentiator 352 may compare the first result vector of the B channel to the training GT image (GT: y), and may acquire a loss value. A training apparatus may output a final loss value by obtaining a weighted average of the loss values. The training apparatus may train the deblurring network 321 based on the final loss value.

A denoising network 312 may receive the training GT image (GT: y) and may output a third intermediate vector with reduced noise. A blurring network 341 may receive the third intermediate vector and may output a second result vector reflecting a blur. The second result vector may include second result vectors for R/G/B channels.

The second differentiator 361 may compare the second result vector of the R channel and the second result vector of the G channel to the training raw image (UDC: x), and may acquire a loss value. The second differentiator 362 may compare the second result vector of the B channel to the training raw image (UDC: x), and may acquire a loss value. The training apparatus may output a final loss value by obtaining a weighted average of the loss values. The training apparatus may train the blurring network 341 based on the final loss value.

The denoising network 311 and the deblurring network 321 may be separately trained based on different pieces of training data. The denoising network 311 and the deblurring network 321 may be trained based on different pieces of training data at the same time or at different times. In FIG. 3, the denoising network 311 may be trained based on a training input image $\hat{x}=x+n$ obtained by reflecting noise n to a training correct answer image x.

Figure 4:
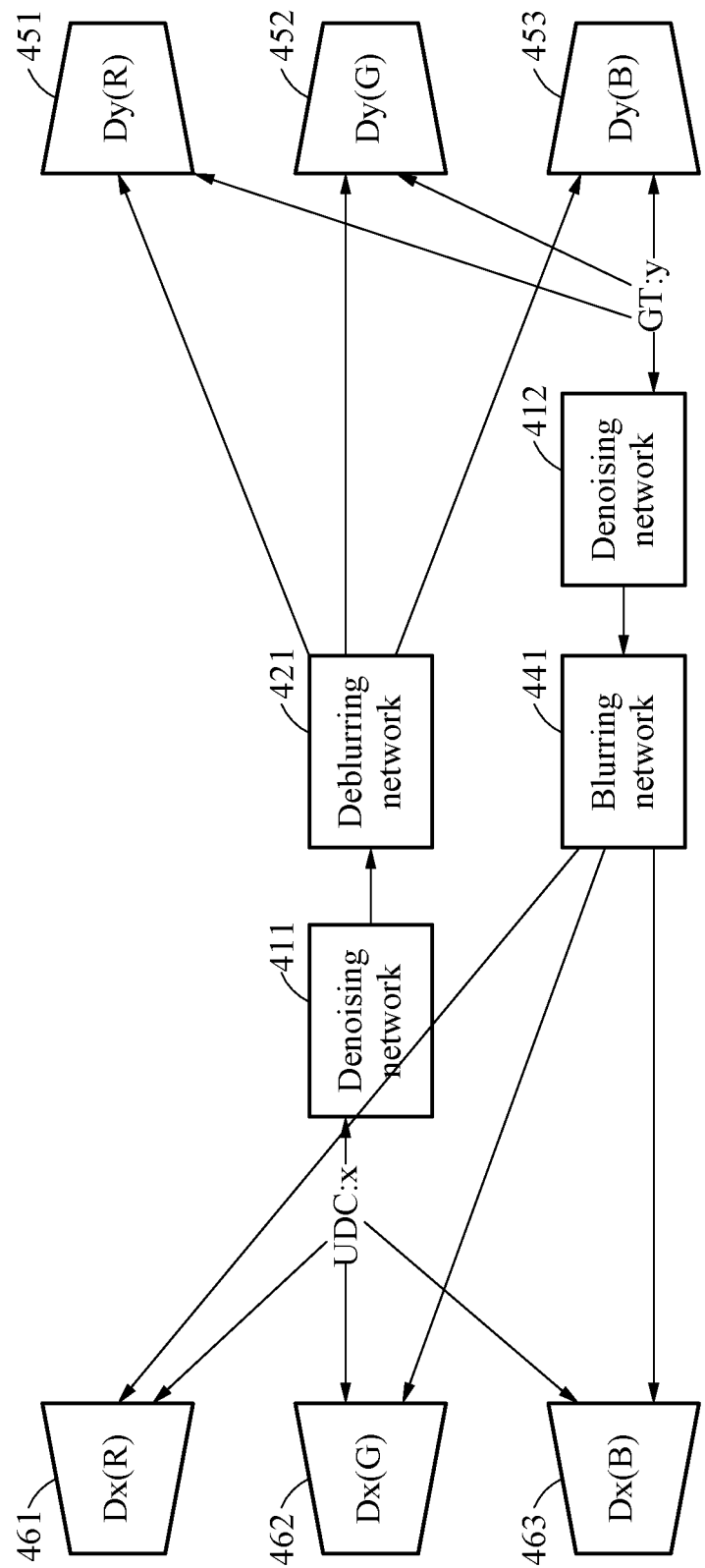
FIG. 4 illustrates an example of a method of training an image enhancement apparatus in which a differentiator for an R channel, a differentiator for a G channel and a differentiator for a B channel are separated, without a noise compensation process.

FIG. 4 illustrates an example of a method of training an image enhancement apparatus in which a differentiator for an R channel, a differentiator for a G channel and a differentiator for a B channel are separated, without a noise compensation process.

Referring to FIG. 4, at least one first differentiator may include a first differentiator 451 for an R channel configured to receive a first result vector of an R channel, a first differentiator 452 for a G channel configured to receive a first result vector of a G channel, and a first differentiator 453 for a B channel configured to receive a first result vector of a B channel. At least one second differentiator may include a second differentiator 461 for an R channel configured to receive a second result vector of an R channel, a second differentiator 462 for a G channel configured to receive a second result vector of a G channel, and a second differentiator 463 for a B channel configured to receive a second result vector of a B channel.

A denoising network 411 may receive a training raw image (UDC: x) and may output a first intermediate vector with reduced noise. A deblurring network 421 may receive the first intermediate vector and may output a first result vector with a reduced blur. The first result vector may include first result vectors for R/G/B channels.

The first differentiator 451 may compare the first result vector of the R channel to a training GT image (GT: y), and may acquire a loss value. The first differentiator 452 may compare the first result vector of the G channel to the training GT image (GT: y), and may acquire a loss value. The first differentiator 453 may compare the first result vector of the B channel to the training GT image (GT: y), and may acquire a loss value. A training apparatus may output a final loss value by obtaining a weighted average of the loss values. The training apparatus may train the deblurring network 421 based on the final loss value.

A denoising network 412 may receive the training GT image (GT: y) and may output a third intermediate vector with reduced noise. A blurring network 441 may receive the third intermediate vector and may output a second result vector reflecting a blur. The second result vector may include second result vectors for R/G/B channels.

The second differentiator 461 may compare the second result vector of the R channel to the training raw image (UDC: x), and may acquire a loss value. The second differentiator 462 may compare the second result vector of the G channel to the training raw image (UDC: x), and may acquire a loss value. The second differentiator 463 may compare the second result vector of the B channel to the training raw image (UDC: x), and may acquire a loss value. The training apparatus may output a final loss value by obtaining a weighted average of the loss values. The training apparatus may train the blurring network 441 based on the final loss value.

The denoising network 411 and the deblurring network 421 may be separately trained based on different pieces of training data. The denoising network 411 and the deblurring network 421 may be trained based on different pieces of training data at the same time or at different times. In FIG. 4, the denoising network 411 may be trained based on a training input image $\hat{x}=x+n$ obtained by reflecting noise n to a training correct answer image x.

Figure 5:
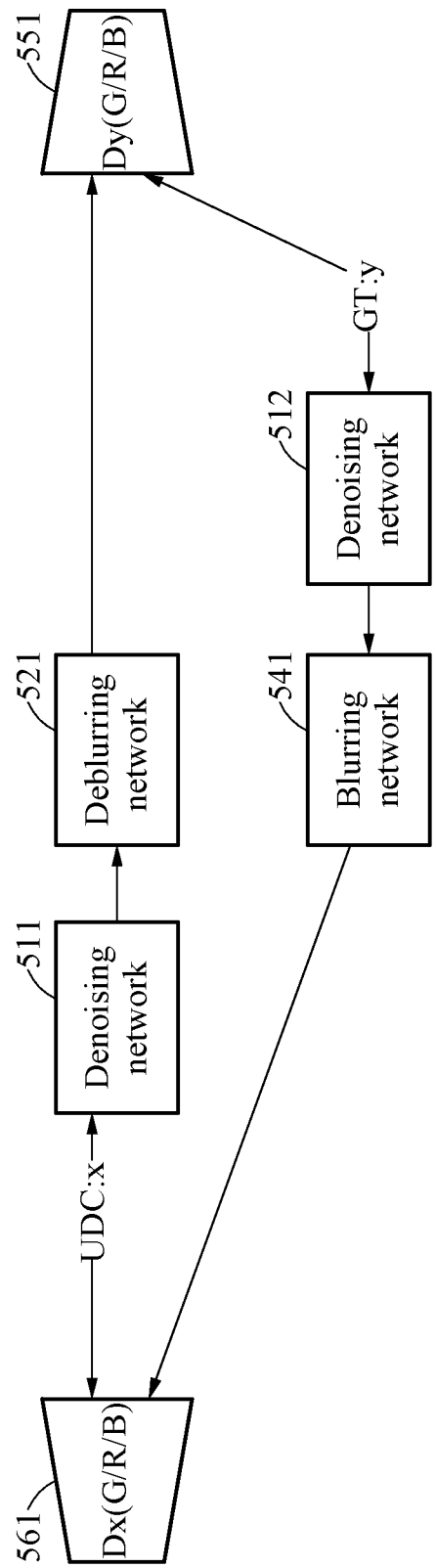
FIG. 5 illustrates an example of a method of training an image enhancement apparatus in which differentiators for R/G/B channels are integrated into a single differentiator, without a noise compensation process.

FIG. 5 illustrates an example of a method of training an image enhancement apparatus in which differentiators for R/G/B channels are integrated into a single differentiator, without a noise compensation process.

Referring to FIG. 5, at least one first differentiator may include a first differentiator 551 for R/G/B channels configured to receive a first result vector for an R channel, a first result vector for a G channel, and a first result vector for a B channel. At least one second differentiator may include a second differentiator 561 for R/G/B channels configured to receive a second result vector for an R channel, a second result vector for a G channel, and a second result vector for a B channel.

A denoising network 511 may receive a training raw image (UDC: x), and may output a first intermediate vector with reduced noise. A deblurring network 521 may receive the first intermediate vector and may output a first result vector with a reduced blur. The first result vector may include first result vectors for R/G/B channels.

The first differentiator 551 may compare the first result vector of the R channel, the first result vector of the G channel and the first result vector of the B channel to a training GT image (GT: y), and may acquire a loss value. A training apparatus may train the deblurring network 521 based on the loss value.

A denoising network 512 may receive the training GT image (GT: y), and may output a third intermediate vector with reduced noise. A blurring network 541 may receive the third intermediate vector and may output a second result vector reflecting a blur. The second result vector may include second result vectors for R/G/B channels.

The second differentiator 561 may compare the second result vector of the R channel, the second result vector of the G channel and the second result vector of the B channel to the training raw image (UDC: x), and may acquire a loss value. The training apparatus may train the blurring network 541 based on the loss value.

The denoising network 511 and the deblurring network 521 may be separately trained based on different pieces of training data. The denoising network 511 and the deblurring network 521 may be trained based on different pieces of training data at the same time or at different times. In FIG. 5, the denoising network 511 may be trained based on a training input image x̂=x+n obtained by reflecting noise n to a training correct answer image x.

Figure 6:
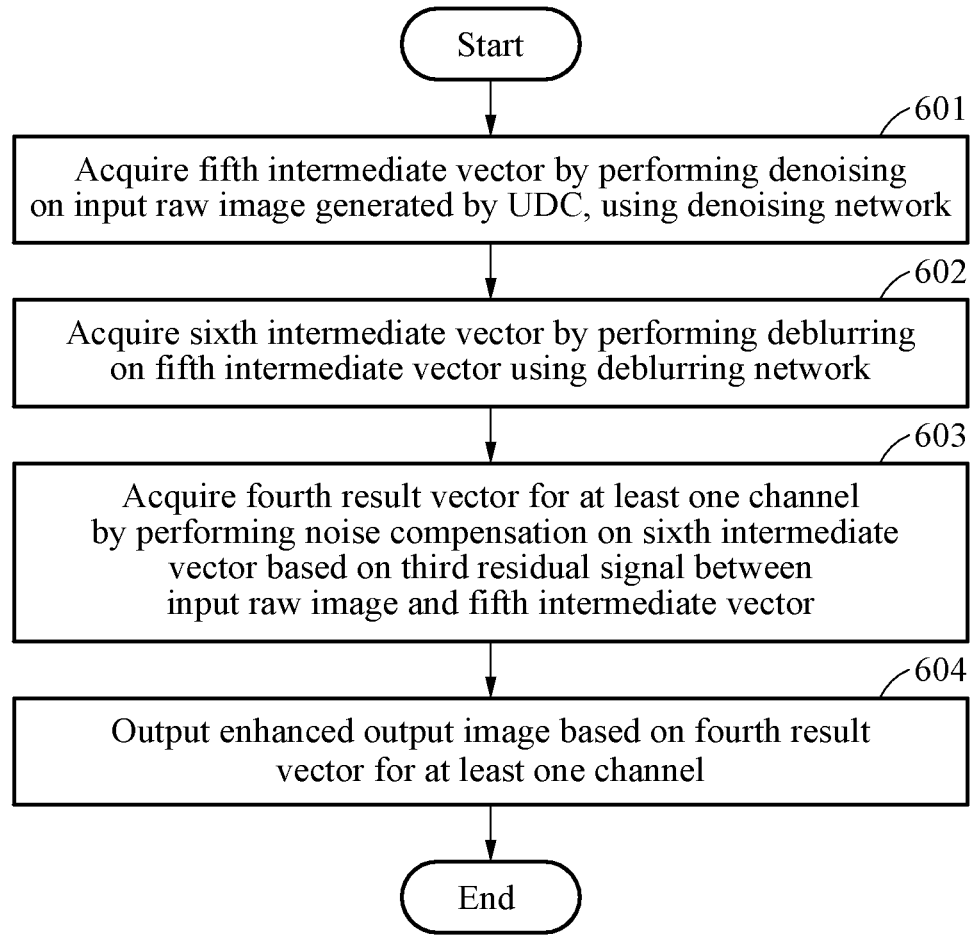
FIG. 6 illustrates an example of an image enhancement method.

FIG. 6 illustrates an example of an image enhancement method. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here. Referring to FIG. 6.

Referring to FIG. 6, in operation 601, an image enhancement apparatus acquires a fifth intermediate vector by performing denoising on an input raw image generated by a UDC, using a denoising network. In operation 602, the image enhancement apparatus acquires a sixth intermediate vector by performing deblurring on the fifth intermediate vector using a deblurring network. In operation 603, the image enhancement apparatus acquires a fourth result vector for each of at least one channel by performing a noise compensation on the sixth intermediate vector based on a third residual signal between the input raw image and the fifth intermediate vector. In operation 604, the image enhancement apparatus outputs an enhanced output image based on the fourth result vector for each of the at least one channel.

The deblurring network and a blurring network used in the image enhancement apparatus may be pre-trained by the method of FIG. 2.

A first intermediate vector may be acquired by performing denoising on a training raw image generated by the UDC, using the denoising network. A first result vector for each of at least one channel may be acquired by performing deblurring on the first intermediate vector using the deblurring network. A first loss value between the first result vector for each of the at least one channel and a training GT image corresponding to the training raw image may be calculated using at least one first differentiator, and the deblurring network and the at least one first differentiator may be trained based on the first loss value.

A third intermediate vector may be acquired by performing denoising on the training GT image using the denoising network. A second result vector for each of at least one channel may be acquired by performing blurring on the third intermediate vector using the blurring network. A second loss value between the second result vector for each of the at least one channel and the training raw image may be calculated using at least one second differentiator. The blurring network and the at least one second differentiator may be trained based on the second loss value.

Figure 7:
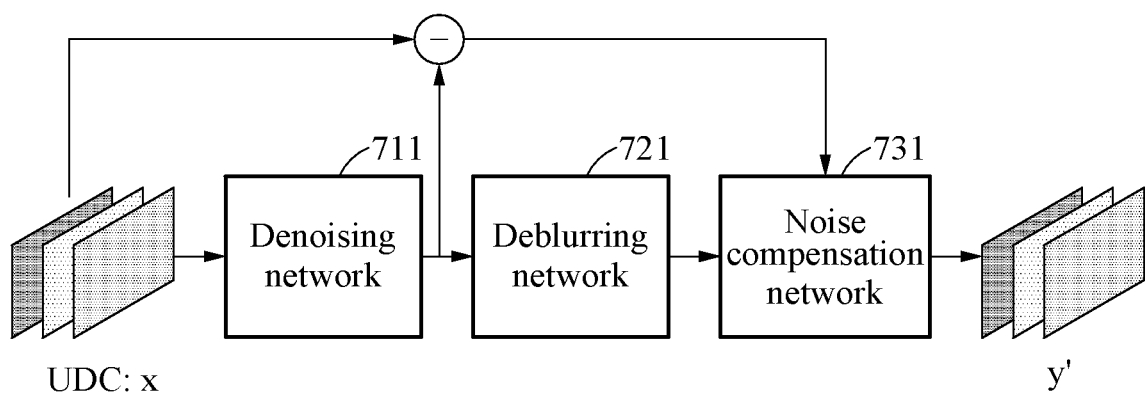
FIG. 7 illustrates an example of a process in which an image is enhanced by an image enhancement apparatus trained by a training method.

FIG. 7 illustrates an example of a process in which an image is enhanced by an image enhancement apparatus trained by a training method.

Referring to FIG. 7, the image enhancement apparatus includes a denoising network 711, a deblurring network 721, and a noise compensation network 731. The denoising network 711, the deblurring network 721, and the noise compensation network 731 may be pre-trained by the method of FIG. 2.

The denoising network 711 may acquire a fifth intermediate vector by performing denoising on an input raw image (UDC: x). The deblurring network 721 may acquire a sixth intermediate vector by performing deblurring on the fifth intermediate vector. The noise compensation network 731 may acquire a fourth result vector for each of at least one channel by performing a noise compensation on the sixth intermediate vector based on a third residual signal between the input raw image (UDC: x) and the fifth intermediate vector. The image enhancement apparatus may output an enhanced output image y based on the fourth result vector for each of the at least one channel.

Figure 8:
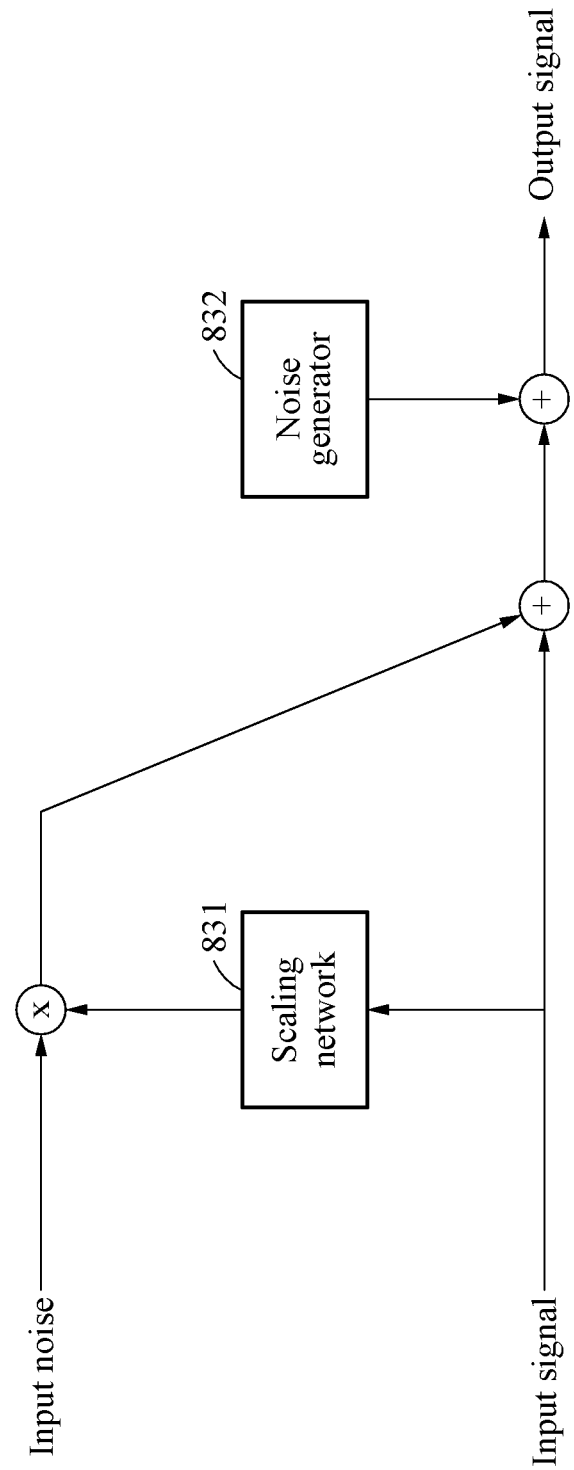
FIG. 8 illustrates an example of an operation of a noise compensation network of an image enhancement apparatus trained by a training method.

FIG. 8 illustrates an example of an operation of a noise compensation network of an image enhancement apparatus trained by a training method.

FIG. 8 illustrates a noise compensation network used in a recognition process of FIG. 6. Referring to FIG. 8, an input signal and input noise indicate the sixth intermediate vector and the third residual signal of FIG. 6, respectively.

A scaling network 831 may adjust a scale of the sixth intermediate vector. A noise level of a GT image may vary depending on an illuminance and a gain. To deceive a differentiator more effectively, the scaling network 831 may perform scaling on the input signal according to a level of noise included in the GT image.

The image enhancement apparatus may perform a multiplication between the adjusted sixth intermediate vector and the third residual signal. The image enhancement apparatus may sum a result vector of the multiplication and the sixth intermediate vector.

An image without any noise may cause awkwardness. To output a familiar image such as film noise, the image enhancement apparatus may reflect artificial noise. To this end, the image enhancement apparatus may combine noise generated by a noise generator 832 and a result obtained by summing the result vector of the multiplication and the sixth intermediate vector, to acquire an output signal on which a noise compensation is performed. The output signal may indicate the fourth result vector of FIG. 6.

Figure 9:
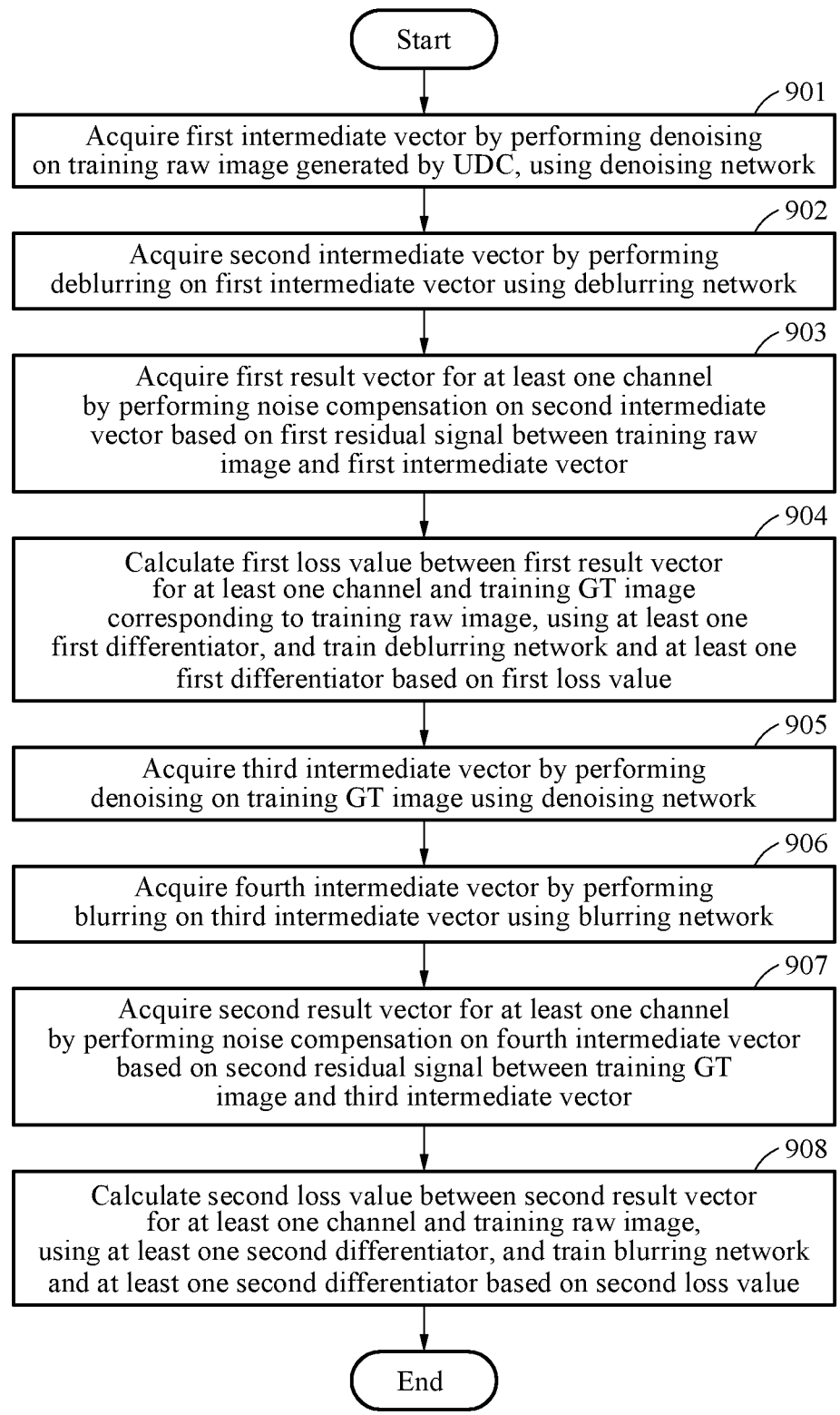
FIG. 9 illustrates another example of a method of training an image enhancement apparatus.

FIG. 9 illustrates another example of a method of training an image enhancement apparatus. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here. Referring to FIG. 9.

FIG. 9 illustrates an example of performing a noise compensation in a training process.

Referring to FIG. 9, in operation 901, a training apparatus acquires a first intermediate vector by performing denoising on a training raw image generated by a UDC, using a denoising network.

In operation 902, the training apparatus acquires a second intermediate vector by performing deblurring on the first intermediate vector using a deblurring network.

In operation 903, the training apparatus acquires a first result vector for each of at least one channel by performing a noise compensation on the second intermediate vector based on a first residual signal between the training raw image and the first intermediate vector.

In operation 904, the training apparatus calculates a first loss value between the first result vector for each of the at least one channel and a training GT image corresponding to the training raw image using at least one first differentiator, and trains the deblurring network and the at least one first differentiator based on the first loss value. The first loss value may be calculated by a weighted average of at least one loss value between the first result vector for each of the at least one channel and the training GT image.

In operation 905, the training apparatus acquires a third intermediate vector by performing denoising on the training GT image using the denoising network.

In operation 906, the training apparatus acquires a fourth intermediate vector by performing blurring on the third intermediate vector using a blurring network.

In operation 907, the training apparatus acquires a second result vector for each of the at least one channel by performing a noise compensation on the fourth intermediate vector based on a second residual signal between the training GT image and the third intermediate vector.

In operation 908, the training apparatus calculates a second loss value between the second result vector for each of the at least one channel and the training raw image using at least one second differentiator, and trains the blurring network and the at least one second differentiator based on the second loss value. The second loss value may be calculated by a weighted average of at least one loss value between the second result vector for each of the at least one channel and the training raw image.

The denoising network and the deblurring network of the image enhancement apparatus may be separately trained. The denoising network and the deblurring network may be trained through separate pipelines, respectively. The denoising network and the deblurring network may be trained at the same time or at different times. Trained parameters of the denoising network may be shared in training of the deblurring network.

In a pipeline for training of the denoising network, the training apparatus may reflect noise to a training input image. The training input image used in the pipeline for the denoising network may be different from training data of a pipeline for training of the deblurring network. The training apparatus may acquire a third result vector by inputting a result image reflecting the noise to the denoising network. The training apparatus may calculate a third loss value between the third result vector and the training input image, and may train the denoising network based on the third loss value. Thus, the denoising network and the deblurring network of the image enhancement apparatus may be trained at a high level.

Figure 10:
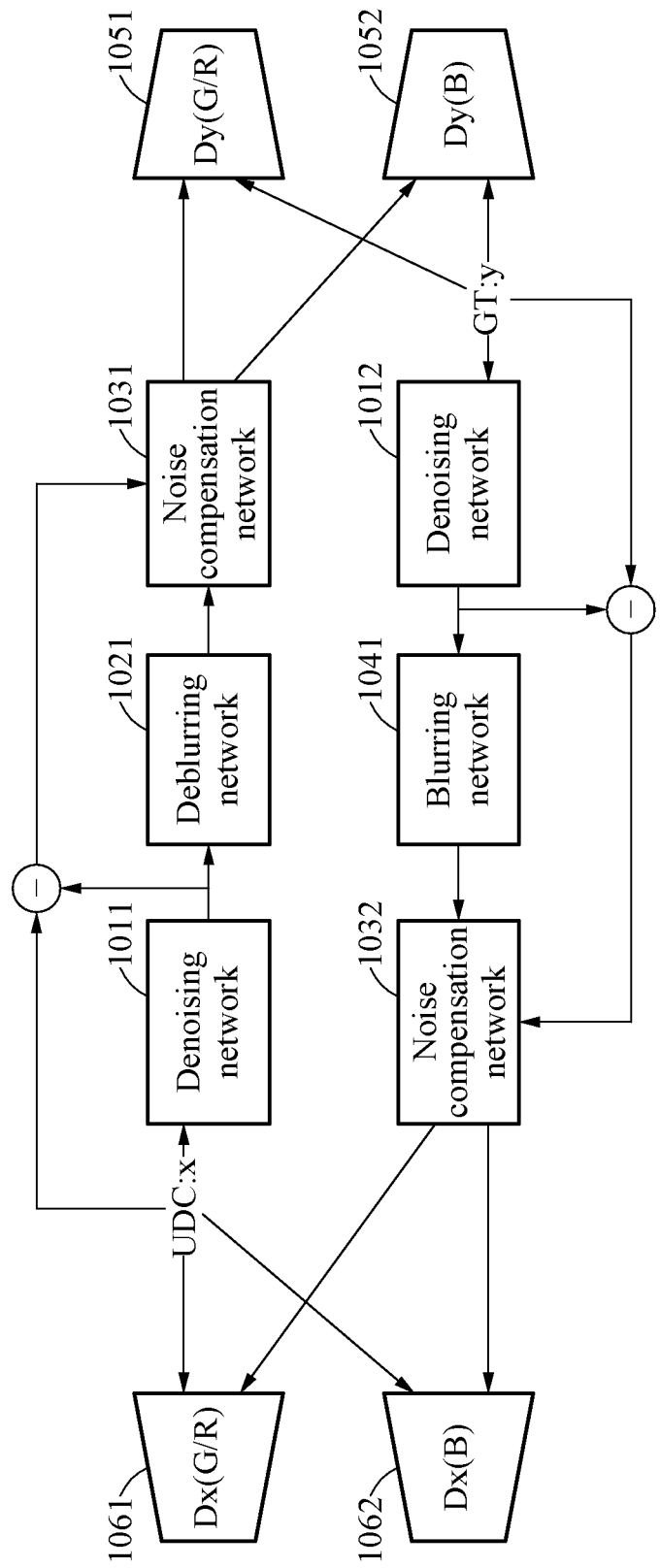
FIG. 10 illustrates an example of a method of training an image enhancement apparatus in which a differentiator for R/G channels and a differentiator for a B channel are separated, including a noise compensation process.

FIG. 10 illustrates an example of a method of training an image enhancement apparatus in which a differentiator for R/G channels and a differentiator for a B channel are separated, including a noise compensation process.

In an example of a UDC, as light is absorbed by a panel, the overall intensity of light may tend to decrease. For example, in a blue (B) channel, an intensity shift may occur. To compensate for the intensity shift more accurately, a structure in which a differentiator for R/G channels and a differentiator for a B channel are separated may be used.

Referring to FIG. 10, at least one first differentiator may include a first differentiator 1051 for R/G channels configured to receive a first result vector of an R channel and a first result vector of a G channel, and a first differentiator 1052 for a B channel configured to receive a first result vector of a B channel. At least one second differentiator may include a second differentiator 1061 for R/G channels configured to receive a second result vector of an R channel and a second result vector of a G channel, and a second differentiator 1062 for a B channel configured to receive a second result vector of a B channel.

A denoising network 1011 may receive a training raw image (UDC: x) and may output a first intermediate vector with reduced noise. A deblurring network 1021 may receive the first intermediate vector and may output a second intermediate vector with a reduced blur. A noise compensation network 1031 may receive the second intermediate vector, and may output a first result vector in which noise is compensated for. The first result vector may include first result vectors for each of R/G/B channels.

The first differentiator 1051 may compare the first result vector of the R channel and the first result vector of the G channel to a training GT image (GT: y), and may acquire a loss value. The first differentiator 1052 may compare the first result vector of the B channel to the training GT image (GT: y), and may acquire a loss value. A training apparatus may output a final loss value by obtaining a weighted average of the loss values. The training apparatus may train the deblurring network 1021 and the noise compensation network 1031 based on the final loss value.

A denoising network 1012 may receive the training GT image (GT: y) and may output a third intermediate vector with reduced noise. A blurring network 1041 may receive the third intermediate vector and may output a fourth intermediate vector reflecting a blur. A noise compensation network 1032 may receive the fourth intermediate vector, and may output a second result vector in which noise is compensated for. The second result vector may include second result vectors for R/G/B channels.

The second differentiator 1061 may compare the second result vector of the R channel and the second result vector of the G channel to the training raw image (UDC: x), and may acquire a loss value. The second differentiator 1062 may compare the second result vector of the B channel to the training raw image (UDC: x), and may acquire a loss value. The training apparatus may output a final loss value by obtaining a weighted average of the loss values. The training apparatus may train the blurring network 1041 and the noise compensation network 1032 based on the final loss value.

The denoising network 1011 and the deblurring network 1021 may be separately trained based on different pieces of training data. The denoising network 1011 and the deblurring network 1021 may be trained based on different pieces of training data at the same time or at different times. In FIG. 10, the denoising network 1011 may be trained based on a training input image $\hat{x}=x+n$ obtained by reflecting noise n to a training correct answer image x.

Figure 11:
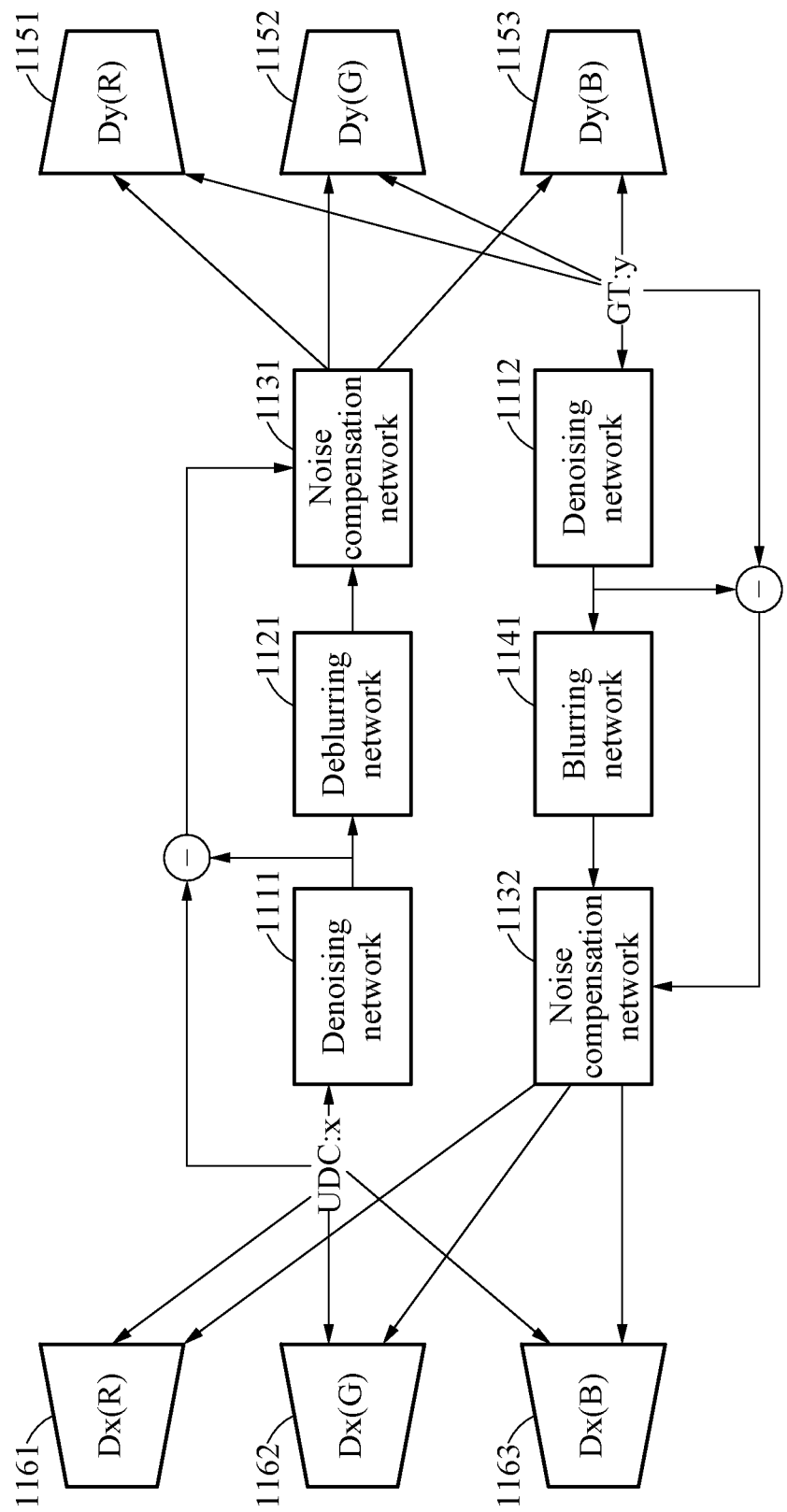
FIG. 11 illustrates an example of a method of training an image enhancement apparatus in which a differentiator for an R channel, a differentiator for a G channel and a differentiator for a B channel are separated, including a noise compensation process.

FIG. 11 illustrates an example of a method of training an image enhancement apparatus in which a differentiator for an R channel, a differentiator for a G channel and a differentiator for a B channel are separated, including a noise compensation process.

Referring to FIG. 11, at least one first differentiator may include a first differentiator 1151 for an R channel configured to receive a first result vector of an R channel, a first differentiator 1152 for a G channel configured to receive a first result vector of a G channel, and a first differentiator 1153 for a B channel configured to receive a first result vector of a B channel. At least one second differentiator may include a second differentiator 1161 for an R channel configured to receive a second result vector of an R channel, a second differentiator 1162 for a G channel configured to receive a second result vector of a G channel, and a second differentiator 1163 for a B channel configured to receive a second result vector of a B channel.

A denoising network 1111 may receive a training raw image (UDC: x) and may output a first intermediate vector with reduced noise. A deblurring network 1121 may receive the first intermediate vector and may output a second intermediate vector with a reduced blur. A noise compensation network 1131 may receive the second intermediate vector and may output a first result vector in which noise is compensated for. The first result vector may include first result vectors for R/G/B channels.

The first differentiator 1151 may compare the first result vector of the R channel to a training GT image (GT: y), and may acquire a loss value. The first differentiator 1152 may compare the first result vector of the G channel to the training GT image (GT: y), and may acquire a loss value. The first differentiator 1153 may compare the first result vector of the B channel to the training GT image (GT: y), and may acquire a loss value. A training apparatus may output a final loss value by obtaining a weighted average of the loss values. The training apparatus may train the deblurring network 1121 and the noise compensation network 1131 based on the final loss value.

A denoising network 1112 may receive the training GT image (GT: y) and may output a third intermediate vector with reduced noise. A blurring network 1141 may receive the third intermediate vector and may output a fourth intermediate vector reflecting a blur. A noise compensation network 1132 may receive the fourth intermediate vector and may output a second result vector in which noise is compensated for. The second result vector may include second result vectors for R/G/B channels.

The second differentiator 1161 may compare the second result vector of the R channel to the training raw image (UDC: x), and may acquire a loss value. The second differentiator 1162 may compare the second result vector of the G channel to the training raw image (UDC: x), and may acquire a loss value. The second differentiator 1163 may compare the second result vector of the B channel to the training raw image (UDC: x), and may acquire a loss value. The training apparatus may output a final loss value by obtaining a weighted average of the loss values. The training apparatus may train the blurring network 1141 and the noise compensation network 1132 based on the final loss value.

The denoising network 1111 and the deblurring network 1121 may be separately trained based on different pieces of training data. The denoising network 1111 and the deblurring network 1121 may be trained based on different pieces of training data at the same time or at different times. In FIG. 11, the denoising network 1111 may be trained based on a training input image $\hat{x}=x+n$ obtained by reflecting noise n to a training correct answer image x.

Figure 12:
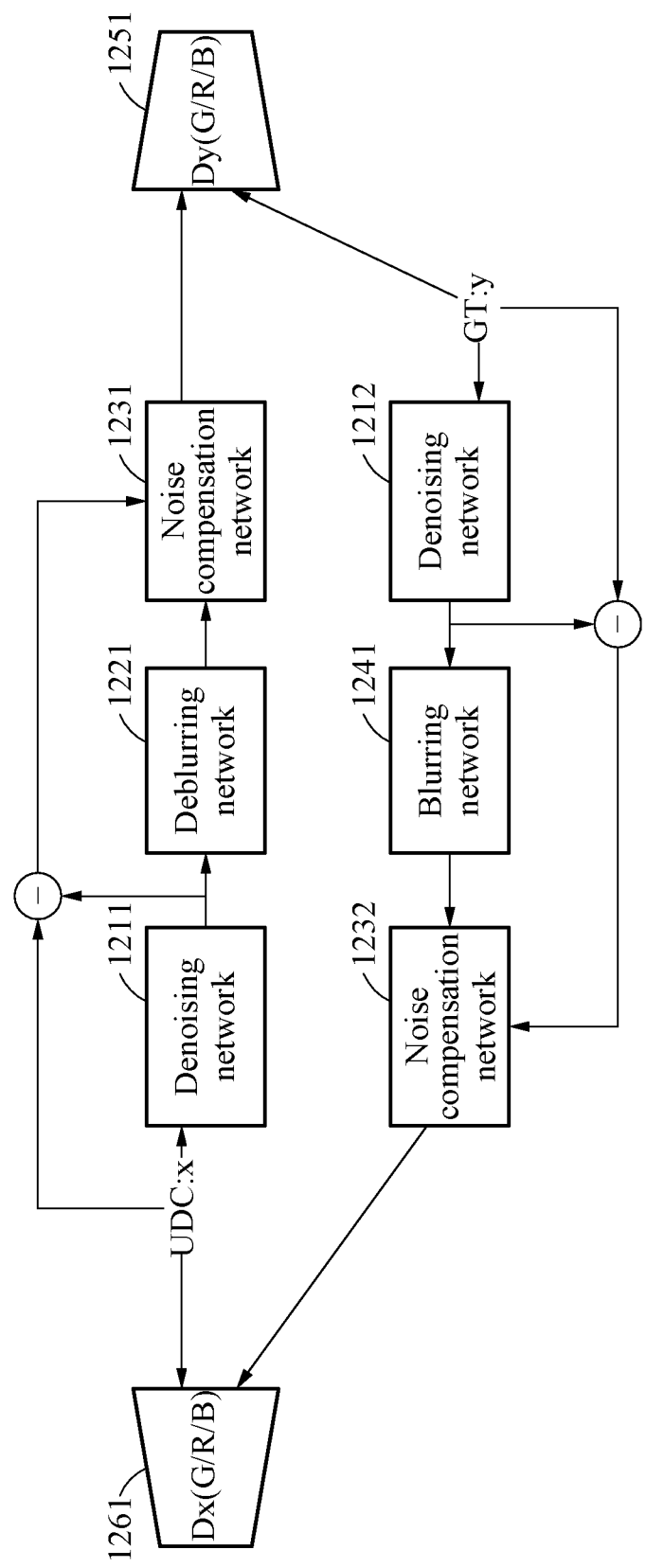
FIG. 12 illustrates an example of a method of training an image enhancement apparatus in which differentiators for R/G/B channels are integrated into a single differentiator, including a noise compensation process.

FIG. 12 illustrates an example of a method of training an image enhancement apparatus in which differentiators for R/G/B channels are integrated into a single differentiator, including a noise compensation process.

Referring to FIG. 12, at least one first differentiator may include a first differentiator 1251 for R/G/B channels configured to receive a first result vector for an R channel, a first result vector for a G channel, and a first result vector for a B channel. At least one second differentiator may include a second differentiator 1261 for R/G/B channels configured to receive a second result vector for an R channel, a second result vector for a G channel, and a second result vector for a B channel.

A denoising network 1211 may receive a training raw image (UDC: x), and may output a first intermediate vector with reduced noise. A deblurring network 1221 may receive the first intermediate vector and may output a second intermediate vector with a reduced blur. A noise compensation network 1231 may receive the second intermediate vector and may output a first result vector in which noise is compensated for. The first result vector may include first result vectors for R/G/B channels.

The first differentiator 1251 may compare the first result vector of the R channel, the first result vector of the G channel and the first result vector of the B channel to a training GT image (GT: y), and may acquire a loss value. A training apparatus may train the deblurring network 1221 and the noise compensation network 1231 based on the loss value.

A denoising network 1212 may receive the training GT image (GT: y), and may output a third intermediate vector with reduced noise. A blurring network 1241 may receive the third intermediate vector and may output a fourth intermediate vector reflecting a blur. A noise compensation network 1232 may receive the fourth intermediate vector and may output a second result vector in which noise is compensated for. The second result vector may include second result vectors for R/G/B channels.

The second differentiator 1261 may compare the second result vector of the R channel, the second result vector of the G channel and the second result vector of the B channel to the training raw image (UDC: x), and may acquire a loss value. The training apparatus may train the blurring network 1241 and the noise compensation network 1232 based on the loss value.

The denoising network 1211 and the deblurring network 1221 may be separately trained based on different pieces of training data. The denoising network 1211 and the deblurring network 1221 may be trained based on different pieces of training data at the same time or at different times. In FIG. 12, the denoising network 1211 may be trained based on a training input image x̂=x+n obtained by reflecting noise n to a training correct answer image x.

Figure 13:
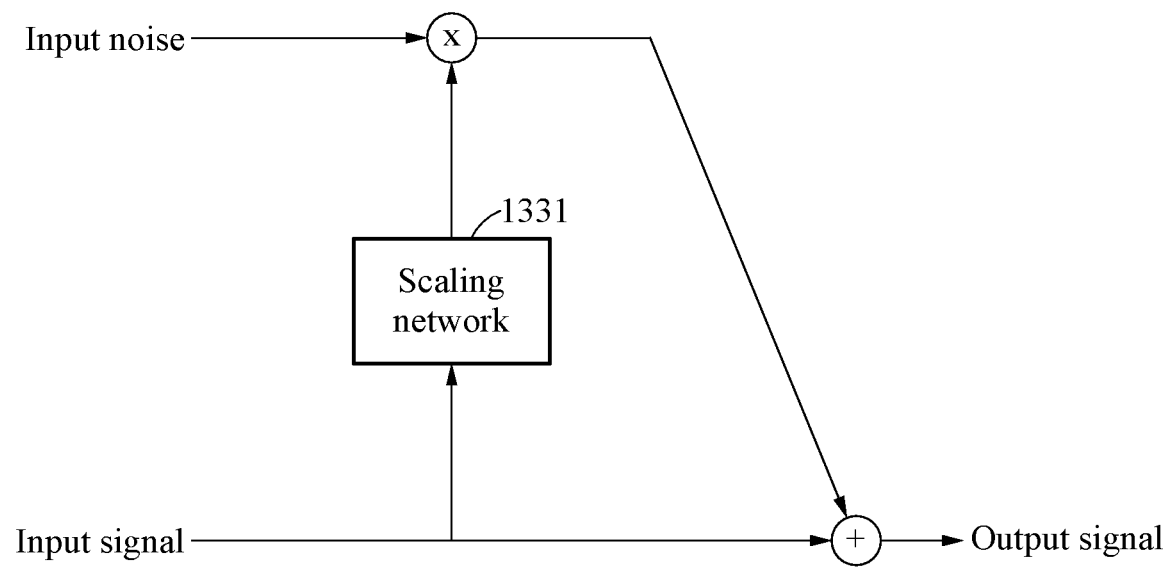
FIG. 13 illustrates an example of an operation of a noise compensation network.

FIG. 13 illustrates an example of an operation of a noise compensation network.

FIG. 13 illustrates a noise compensation network used in both a training process and a recognition process. Referring to FIG. 13, an input signal and input noise indicate the second intermediate vector and the first residual signal of FIG. 9, respectively.

A scaling network 1331 may adjust a scale of the second intermediate vector. A noise level of a GT image may vary depending on an illuminance and a gain. To deceive a differentiator more effectively, the scaling network 1331 may perform scaling on the input signal according to a level of noise included in the GT image.

A training apparatus may perform a multiplication between the adjusted second intermediate vector and the first residual signal. The training apparatus may sum a result vector of the multiplication and the second intermediate vector, to acquire an output signal on which a noise compensation is performed. The output signal may indicate the first result vector of FIG. 9.

Figure 14:
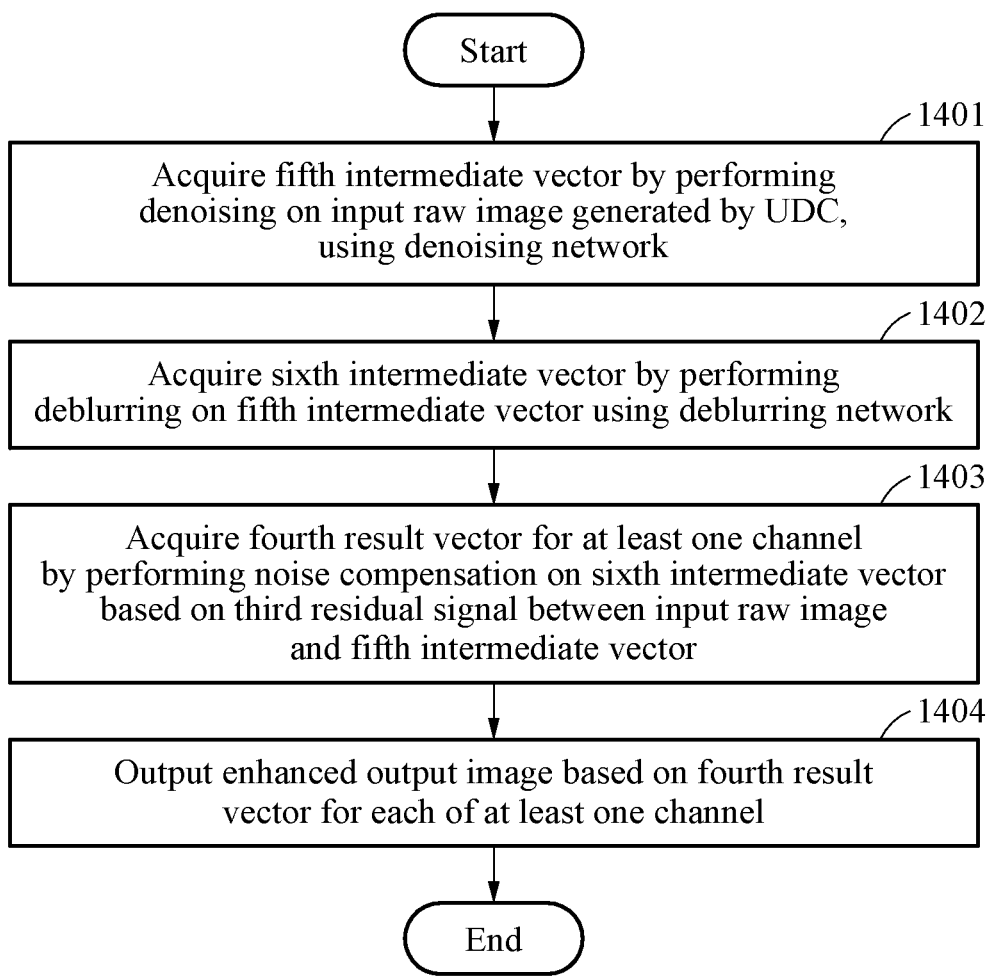
FIG. 14 illustrates another example of an image enhancement method.

FIG. 14 illustrates another example of an image enhancement method. The operations in FIG. 14 may be performed in the sequence and manner as shown, although the order of some operations may be changed or some of the operations omitted without departing from the spirit and scope of the illustrative examples described. Many of the operations shown in FIG. 14 may be performed in parallel or concurrently. One or more blocks of FIG. 14, and combinations of the blocks, can be implemented by special purpose hardware-based computer, such as a processor, that perform the specified functions, or combinations of special purpose hardware and computer instructions. In addition to the description of FIG. 14 below, the descriptions of FIGS. 1-13 are also applicable to FIG. 14, and are incorporated herein by reference. Thus, the above description may not be repeated here. Referring to FIG. 14.

A deblurring network and a blurring network to be used in an image enhancement apparatus may be pre-trained by the method of FIG. 9. A training raw image of a training process may have a corresponding GT image as a correct answer corresponding to the training raw image, whereas an input raw image input to the image enhancement apparatus in an inference process may not have a corresponding GT image. The image enhancement apparatus may aim to output an enhanced result from the input raw image.

Referring to FIG. 14, in operation 1401, the image enhancement apparatus acquires a fifth intermediate vector by performing denoising on an input raw image generated by a UDC, using a denoising network. In operation 1402, the image enhancement apparatus acquires a sixth intermediate vector by performing deblurring on the fifth intermediate vector using a deblurring network. In operation 1403, the image enhancement apparatus acquires a fourth result vector for each of at least one channel by performing a noise compensation on the sixth intermediate vector based on a third residual signal between the input raw image and the fifth intermediate vector. In operation 1404, the image enhancement apparatus outputs an enhanced output image based on the fourth result vector for each of the at least one channel.

Figure 15:
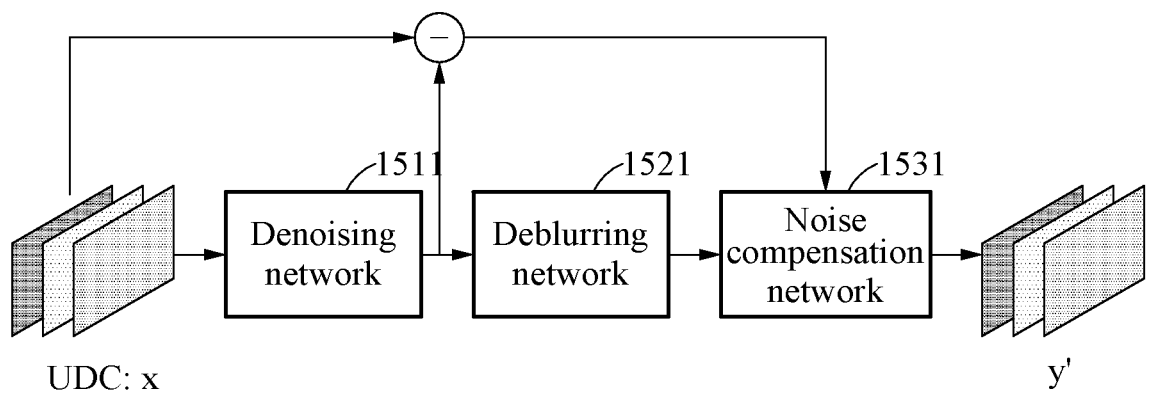
FIG. 15 illustrates another example of a process in which an image is enhanced by an image enhancement apparatus trained by a training method.

FIG. 15 illustrates another example of a process in which an image is enhanced by an image enhancement apparatus trained by a training method.

Referring to FIG. 15, the image enhancement apparatus includes a denoising network 1511, a deblurring network 1521, and a noise compensation network 1531. The denoising network 1511, the deblurring network 1521, and the noise compensation network 1531 may be pre-trained by the method of FIG. 9.

The denoising network 1511 may acquire a fifth intermediate vector by performing denoising on an input raw image (UDC: x). The deblurring network 1521 may acquire a sixth intermediate vector by performing deblurring on the fifth intermediate vector. The noise compensation network 1531 may acquire a fourth result vector for each of at least one channel by performing a noise compensation on the sixth intermediate vector based on a third residual signal between the input raw image (UDC: x) and the fifth intermediate vector. The image enhancement apparatus may output an enhanced output image y based on the fourth result vector for each of the at least one channel.

Figure 16:
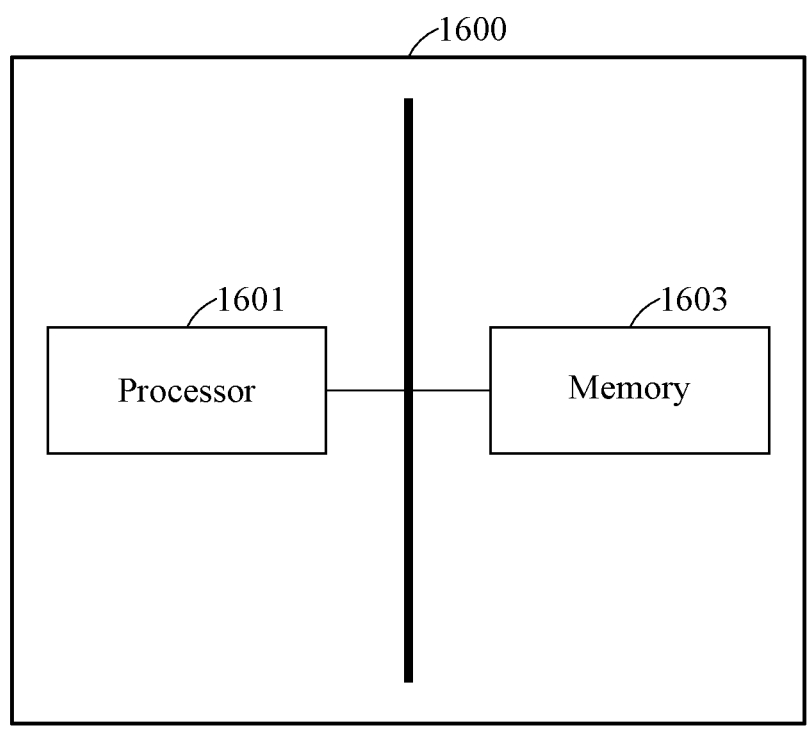
FIG. 16 illustrates an example of a configuration of a training apparatus.

FIG. 16 illustrates an example of a configuration of a training apparatus 1600.

Referring to FIG. 16, the training apparatus 1600 may include a processor 1601 and a memory 1603.

In an example, the processor 1601 may acquire a first intermediate vector by performing denoising on a training raw image generated by a UDC, using a denoising network. The processor 1601 may acquire a first result vector for each of at least one channel by performing deblurring on the first intermediate vector using a deblurring network.

The processor 1601 may calculate a first loss value between the first result vector for each of the at least one channel and a training ground truth (GT) image corresponding to the training raw image using at least one first differentiator, and train the deblurring network and the at least one first differentiator based on the first loss value.

The processor 1601 may acquire a third intermediate vector by performing denoising on the training GT image using the denoising network. The processor 1601 may acquire a second result vector for each of at least one channel by performing blurring on the third intermediate vector using a blurring network.

The processor 1601 may calculate a second loss value between the second result vector for each of the at least one channel and the training raw image using at least one second differentiator, and train the blurring network and the at least one second differentiator based on the second loss value.

In another example, the processor 1601 may acquire a first intermediate vector by performing denoising on a training raw image generated by the UDC, using the denoising network. The processor 1601 may acquire a second intermediate vector by performing deblurring on the first intermediate vector using the deblurring network.

The processor 1601 may acquire a first result vector for each of at least one channel by performing a noise compensation on the second intermediate vector based on a first residual signal between the training raw image and the first intermediate vector.

The processor 1601 may calculate a first loss value between the first result vector for each of the at least one channel and a training ground truth (GT) image corresponding to the training raw image using at least one first differentiator, and train the deblurring network and the at least one first differentiator based on the first loss value.

The processor 1601 may acquire a third intermediate vector by performing denoising on the training GT image using the denoising network. The processor 1601 may acquire a fourth intermediate vector by performing blurring on the third intermediate vector using the blurring network.

The processor 1601 may acquire a second result vector for each of at least one channel by performing a noise compensation on the fourth intermediate vector based on a second residual signal between the training GT image and the third intermediate vector.

The processor 1601 may calculate a second loss value between the second result vector for each of the at least one channel and the training raw image using at least one second differentiator, and train the blurring network and the at least one second differentiator based on the second loss value.

Figure 17:
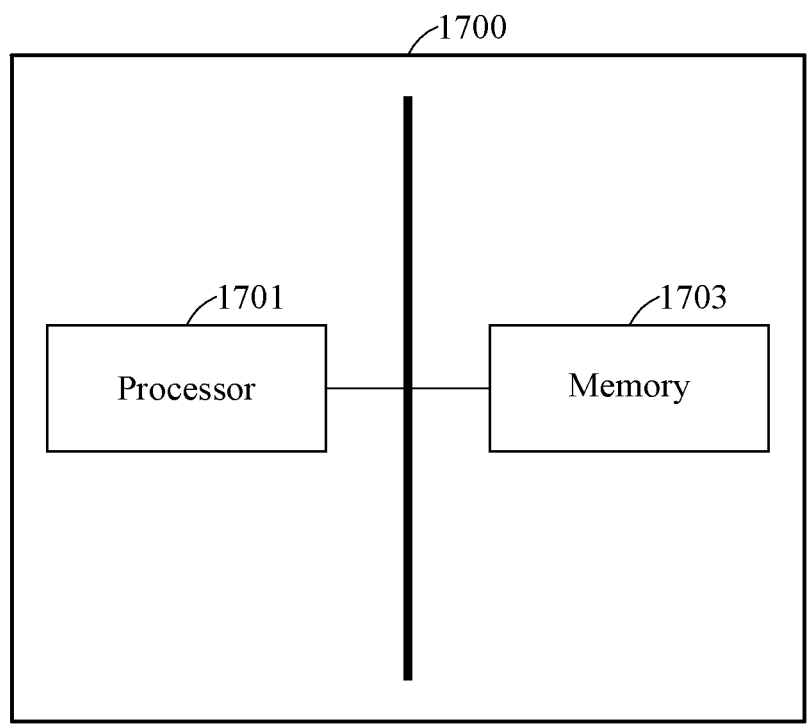
FIG. 17 illustrates an example of a configuration of an image enhancement apparatus.

FIG. 17 illustrates an example of a configuration of an image enhancement apparatus 1700.

Referring to FIG. 17, the image enhancement apparatus 1700 may include at least one processor 1701 and a memory 1703.

In an example, the processor 1701 may acquire a fifth intermediate vector by performing denoising on an input raw image generated by a UDC, using a denoising network. The processor 1701 may acquire a sixth intermediate vector by performing deblurring on the fifth intermediate vector using a deblurring network. The processor 1701 may acquire a fourth result vector for each of at least one channel by performing a noise compensation on the sixth intermediate vector based on a third residual signal between the input raw image and the fifth intermediate vector. The processor 1701 may output an enhanced output image based on the fourth result vector for each of the at least one channel.

In this example, the deblurring network and a blurring network used in the image enhancement apparatus 1700 may be pre-trained by the method of FIG. 2.

A first intermediate vector may be acquired by performing denoising on a training raw image generated by the UDC, using the denoising network. A first result vector for each of at least one channel may be acquired by performing deblurring on the first intermediate vector using the deblurring network. A first loss value between the first result vector for each of the at least one channel and a training GT image corresponding to the training raw image may be calculated using at least one first differentiator, and the deblurring network and the at least one first differentiator may be trained based on the first loss value.

A third intermediate vector may be acquired by performing denoising on the training GT image using the denoising network. A second result vector for each of at least one channel may be acquired by performing blurring on the third intermediate vector using the blurring network. A second loss value between the second result vector for each of the at least one channel and the training raw image may be calculated using at least one second differentiator, and the blurring network and the at least one second differentiator may be trained based on the second loss value.

In another example, the processor 1701 may acquire a fifth intermediate vector by performing denoising on an input raw image generated by the UDC, using the denoising network. The processor 1701 may acquire a sixth intermediate vector by performing deblurring on the fifth intermediate vector using the deblurring network. The processor 1701 may calculate a fourth result vector for each of at least one channel by performing a noise compensation on the sixth intermediate vector based on a third residual signal between the input raw image and the fifth intermediate vector. The processor 1701 may output an enhanced output image based on the fourth result vector for each of the at least one channel.

In this example, the deblurring network and the blurring network used in the image enhancement apparatus 1700 may be pre-trained by the method of FIG. 9.

A first intermediate vector may be acquired by performing denoising on a training raw image generated by the UDC, using the denoising network. A second intermediate vector may be acquired by performing deblurring on the first intermediate vector using the deblurring network. A first result vector for each of at least one channel may be acquired by performing a noise compensation on the second intermediate vector based on a first residual signal between the training raw image and the first intermediate vector. A first loss value between the first result vector for each of the at least one channel and a training GT image corresponding to the training raw image may be calculated using at least one first differentiator, and the deblurring network and the at least one first differentiator may be trained based on the first loss value.

A third intermediate vector may be acquired by performing denoising on the training GT image using the denoising network. A fourth intermediate vector may be acquired by performing blurring on the third intermediate vector using the blurring network. A second result vector for each of at least one channel may be acquired by performing a noise compensation on the fourth intermediate vector based on a second residual signal between the training GT image and the third intermediate vector. A second loss value between the second result vector for each of the at least one channel and the training raw image may be calculated using at least one second differentiator, and the blurring network and the at least one second differentiator may be trained based on the second loss value.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a field-programmable gate array (FPGA), an application-specific integrated circuit (ASIC), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of training an image enhancement apparatus. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of training an image enhancement apparatus, the method comprising:
    generating a training raw image using an under-display camera (UDC);
    acquiring a first intermediate vector by performing denoising on the training raw image using a denoising network;
    acquiring a first result vector for at least one channel by performing deblurring on the first intermediate vector using a deblurring network;
    calculating a first loss value between the first result vector and a training ground truth (GT) image corresponding to the training raw image using at least one first differentiator, and training the deblurring network and the at least one first differentiator based on the first loss value;

acquiring a third intermediate vector by performing denoising on the training GT image using the denoising network;

acquiring a second result vector for the at least one channel by performing blurring on the third intermediate vector using a blurring network; and calculating a second loss value between the second result vector for the at least one channel and the training raw image using at least one second differentiator, and training the blurring network and the at least one second differentiator based on the second loss value.

2. The method of claim 1, wherein:
the at least one first differentiator comprises:
a first differentiator for R/G channels configured to receive a first result vector of an R channel and a first result vector of a G channel; and
a first differentiator for a B channel configured to receive a first result vector of a B channel, and
the at least one second differentiator comprises:
a second differentiator for the R/G channels configured to receive a second result vector of the R channel and a second result vector of the G channel; and
a second differentiator for the B channel configured to receive a second result vector of the B channel.

3. The method of claim 1, wherein:
the at least one first differentiator comprises:
a first differentiator for an R channel configured to receive a first result vector of an R channel;
a first differentiator for a G channel configured to receive a first result vector of a G channel; and
a first differentiator for a B channel configured to receive a first result vector of a B channel, and
the at least one second differentiator comprises:
a second differentiator for the R channel configured to receive a second result vector of the R channel;
a second differentiator for the G channel configured to receive a second result vector of the G channel; and
a second differentiator for the B channel configured to receive a second result vector of the B channel.

4. The method of claim 1, wherein:
the at least one first differentiator comprises a first differentiator for R/G/B channels configured to receive a first result vector of an R channel, a first result vector of a G channel and a first result vector of a B channel, and
the at least one second differentiator comprises a second differentiator for the R/G/B channels configured to receive a second result vector of the R channel, a second result vector of the G channel and a second result vector of the B channel.

5. The method of claim 1, further comprising:
reflecting noise to a training input image;
acquiring a third result vector by inputting a result image reflecting the noise to the denoising network;
calculating a third loss value between the third result vector and the training input image; and
training the denoising network based on the third loss value.

6. The method of claim 1, wherein:
the calculating of the first loss value comprises calculating the first loss value based on a weighted average of at least one loss value between the first result vector for the at least one channel and the training GT image, and
the calculating of the second loss value comprises calculating the second loss value based on a weighted average of at least one loss value between the second result vector for the at least one channel and the training raw image.

7. The method of claim 1, wherein:
the acquiring of the first result vector comprises:
acquiring a second intermediate vector by performing deblurring on the first intermediate vector using the deblurring network; and
acquiring the first result vector for the at least one channel by performing a noise compensation on the second intermediate vector based on a first residual signal between the training raw image and the first intermediate vector, and
the acquiring of the second result vector comprises:
acquiring a fourth intermediate vector by performing blurring on the third intermediate vector using the blurring network; and
acquiring the second result vector for the at least one channel by performing a noise compensation on the fourth intermediate vector based on a second residual signal between the training GT image and the third intermediate vector.

8. The method of claim 7, wherein the acquiring of the first result vector for the at least one channel by performing the noise compensation on the second intermediate vector comprises:
adjusting a scale of the second intermediate vector;
performing a multiplication between the adjusted second intermediate vector and the first residual signal; and
acquiring the first result vector by summing a result vector of the multiplication and the second intermediate vector.

9. A non-transitory computer-readable storage medium storing instructions that, when executed by a processor, cause the processor to perform the method of claim 1.

10. An image enhancement method comprising:
generating an input raw image being generated by an under-display camera (UDC);
acquiring a fifth intermediate vector by performing denoising on the input raw image using a denoising network;
acquiring a sixth intermediate vector by performing deblurring on the fifth intermediate vector using a deblurring network;
acquiring a fourth result vector for at least one channel by performing a noise compensation on the sixth intermediate vector based on a third residual signal between the input raw image and the fifth intermediate vector; and
outputting an enhanced output image based on the fourth result vector for the at least one channel,
wherein a first intermediate vector is acquired by performing denoising on a training raw image generated by the UDC, using the denoising network, a first result vector for the at least one channel is acquired by performing deblurring on the first intermediate vector using the deblurring network, a first loss value between the first result vector for the at least one channel and a training ground truth (GT) image corresponding to the training raw image is calculated using at least one first differentiator, and the deblurring network and the at least one first differentiator are trained based on the first loss value, and
wherein a third intermediate vector is acquired by performing denoising on the training GT image using the denoising network, a second result vector for the at least one channel is acquired by performing blurring on the third intermediate vector using a blurring network, a second loss value between the second result vector for the at least one channel and the training raw image is calculated using at least one second differentiator, and the blurring network and the at least one second differentiator are trained based on the second loss value.

11. The image enhancement method of claim 10, wherein:
the first result vector for the at least one channel is acquired by acquiring a second intermediate vector by performing deblurring on the first intermediate vector using the deblurring network, and by performing a noise compensation on the second intermediate vector based on a first residual signal between the training raw image and the first intermediate vector, and
the second result vector is acquired by acquiring a fourth intermediate vector by performing blurring on the third intermediate vector using the blurring network, and by performing a noise compensation on the fourth intermediate vector based on a second residual signal between the training GT image and the third intermediate vector.

12. The image enhancement method of claim 10, wherein the acquiring of the fourth result vector comprises:
adjusting a scale of the sixth intermediate vector;
performing a multiplication between the adjusted sixth intermediate vector and the third residual signal; and
acquiring the fourth result vector by summing a result vector of the multiplication and the sixth intermediate vector and by combining a result of the summing and noise generated by a noise generator.

13. An apparatus for training an image enhancement apparatus, the apparatus comprising:
an under-display camera (UDC) configured to generate a training raw image using; and
a processor configured to:
acquire a first intermediate vector by performing denoising on the training raw image using a denoising network;
acquire a first result vector for at least one channel by performing deblurring on the first intermediate vector using a deblurring network;
calculate a first loss value between the first result vector and a training ground truth (GT) image corresponding to the training raw image using at least one first differentiator, and train the deblurring network and the at least one first differentiator based on the first loss value;
acquire a third intermediate vector by performing denoising on the training GT image using the denoising network;
acquire a second result vector for the at least one channel by performing blurring on the third intermediate vector using a blurring network; and
calculate a second loss value between the second result vector for the at least one channel and the training raw image using at least one second differentiator, and train the blurring network and the at least one second differentiator based on the second loss value.

14. The apparatus of claim 13, wherein the processor is further configured to:
acquire a second intermediate vector by deblurring the first intermediate vector using the deblurring network;
acquire the first result vector for the at least one channel by performing a noise compensation on the second intermediate vector based on a first residual signal between the training raw image and the first intermediate vector;
acquire a fourth intermediate vector by blurring the third intermediate vector using the blurring network; and
acquire the second result vector for the at least one channel by performing a noise compensation on the fourth intermediate vector based on a second residual signal between the training GT image and the third intermediate vector.

* * * * *